Patented Apr. 9, 1940

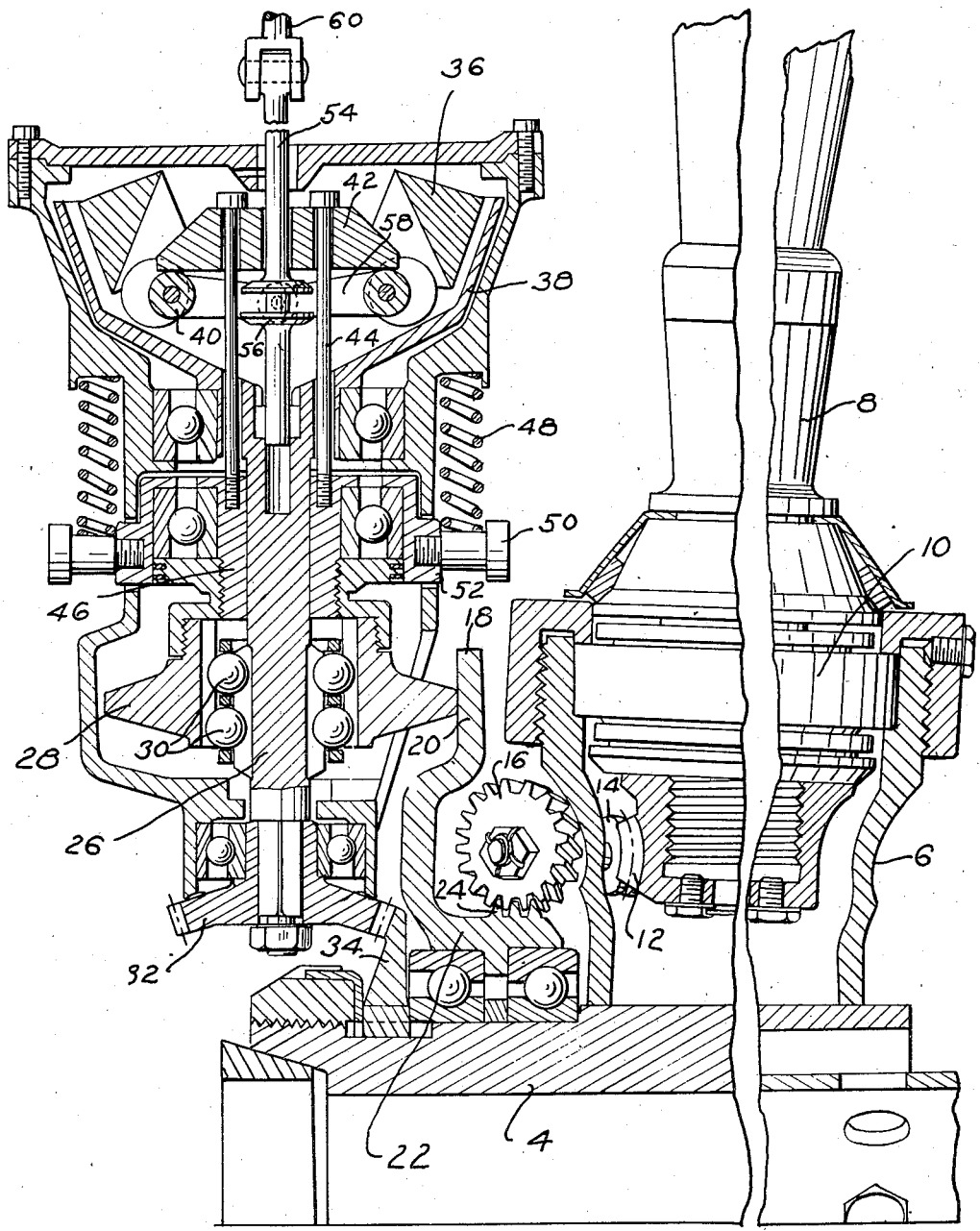

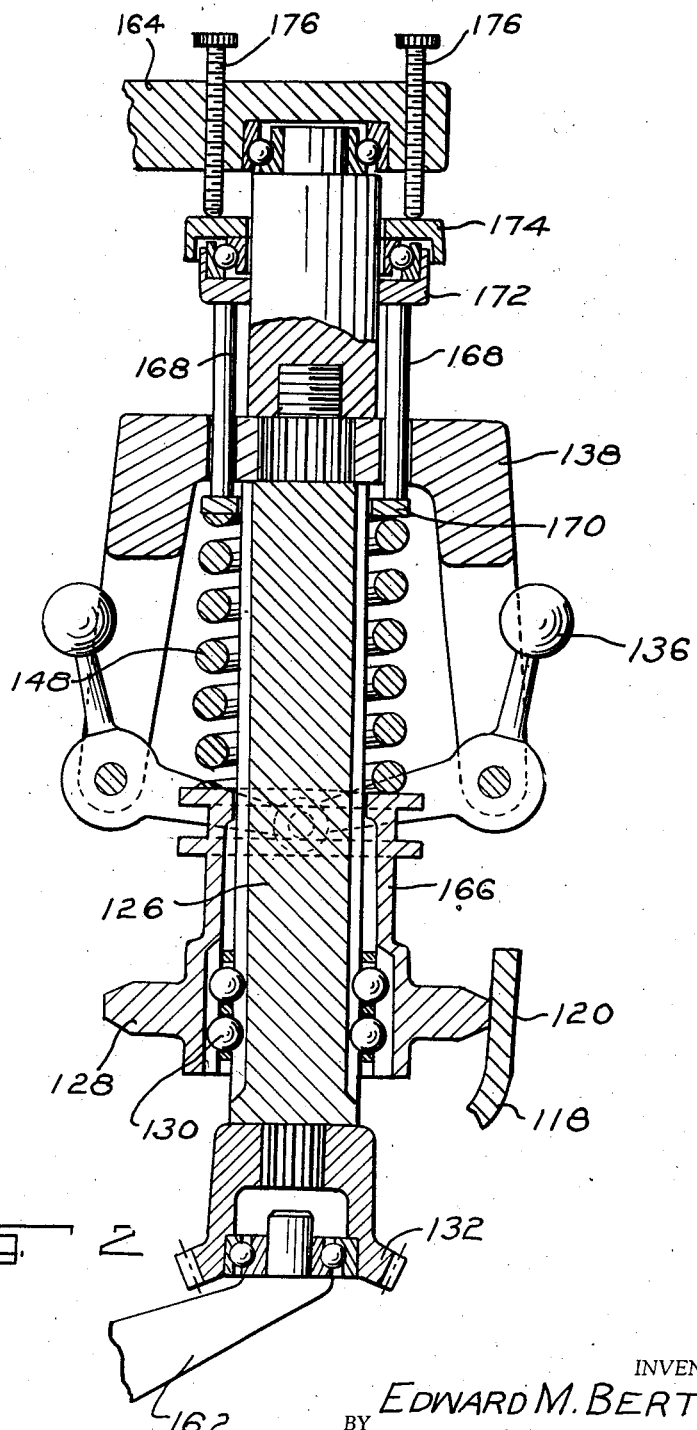

2,196,654

UNITED STATES PATENT OFFICE 2,196,654

VARIABLE PITCH PROPELLER

Edward M. Bertran, Washington, D. C., assignor to Engineering and Research Corp., Washington, D. C., a corporation of District of Columbia Application October 30, 1937, Serial No. 171,824

12 Claims. (Cl. 170—163)

This invention relates to variable pitch propellers and more particularly to propellers having mechanical means to vary the pitch of the blades.

One of the objects of the invention is to provide a variable pitch propeller which is simple in construction and operation and which operates positively to vary the blade pitch.

Another object of the invention is to provide a variable pitch propeller which is automatically controllable to maintain any desired even speed. Preferably the propeller is also subject to manual control so that the pilot can obtain the desired blade pitch independently of or regardless of the automatic control.

The above and other objects of the invention may be realized by providing a second shaft at right angles to the propeller shaft and driven therefrom through a gear train. A driving roller splined to the second shaft drivably engages an annular disc rotatable on the propeller shaft and connected to the blade to turn it about its own axis. The roller is preferably controlled by centrifugal means carried by the second shaft and resiliently opposed by springs or the like. If desired, a manual control device may be provided to control the roller at will.

When the roller is in a position to drive the disc at the same speed as the propeller shaft, the blade pitch will remain fixed. However, if the disc is driven either faster or slower than the propeller shaft, the blade will be turned.

Other objects and advantages of the invention, including desirable subcombinations and structural features will be apparent from the following description of the embodiments illustrated in the accompanying drawings, in which:

Figure 1 is a partial section with parts in elevation of a propeller embodying the invention; and Figure 2 is a partial view similar to Figure 1 showing a modified construction.

The propeller illustrated in Figure 1 comprises an annular propeller shaft 4 which may be connected to or form an extension of a suitable driving shaft such as the crank shaft of an internal combustion engine. A plurality of radial sockets 6 are secured to the shaft 4 and are adapted rotatably to support propeller blades 8 which are journaled therein by means of suitable bearings 10. Each blade 8 is formed at its root end with a worm gear segment 12 meshing with a worm 14 carried by the socket 6 and having at its outer end a worm gear 16.

An annular disc 18 is rotatably mounted on the propeller shaft and has a radial flat portion 20 and a hub portion 22 formed with a worm thread 24 meshing with the gear 16. When the disc 18 is rotating at the same speed as the propeller shaft, the gear 16 and worm 14 will not turn about their axis, but if the disc is rotated relative to the propeller shaft, the worm 14 will be turned to rotate the blade in its socket. It will be understood that any desired number of blades may be provided with a corresponding number of worms 14 and gears 16.

In order to drive the disc 18, there is provided according to the present invention a second shaft 26 extending substantially at right angles from the propeller shaft and parallel to the portion 20 of the disc. A traction roller 28 is formed with a series of internal axial grooves fitting over bearing rollers 30 which fit into similar grooves in the shaft 26 to spline the roller on the shaft and has its edge in driving engagement with the portion 20 of the disc. The shaft 26 carries at its inner end a pinion 32 meshing with an annular gear 34 which is secured to the propeller shaft 4 so that the shaft 26 will always be driven at a speed proportional to the speed of the propeller shaft. The driving ratio between the gears 32 and 34 and roller 28 and disc 18 is such that when the roller is in substantially the position shown, the disc will be driven in the same direction and at the same speed as the propeller shaft. If the roller is shifted inwardly, the disc will be driven faster, and if the roller is shifted outwardly, the disc will be driven slower, as will be apparent.

The position of the roller is preferably controlled automatically in order to maintain the blade pitch at such a value as to give the propeller shaft a desired constant speed. In order to effect this control, there is provided a series of centrifugal weights 36 secured to a bell shaped extension 38 on the shaft 26 and carrying eccentrics 40 engageable with a head member 42. Preferably the weights 36 and the eccentrics 40 are pivoted on suitable shafts extending across the extension 38. The head member 42 is connected through rods 44 with a sleeve 46 which is secured to the roller 28 so that movement of the head member will cause a corresponding movement of the roller. As shown, the weights 36 are adapted to move the head member radially outward as they fly out in response to centrifugal force, and this movement is opposed by a series of coil springs 48 engaging lugs 50 carried by a collar 52 which is rotatable on the sleeve 46. With this construction the position of the roller will depend upon the balance between the springs 48 and the centrifugal weights 36 so that the speed of shaft 26 required to move the roller to its neutral position can be controlled by varying the tension of the springs.

Manual control means are provided according to the invention to move the roller at will, such means as shown comprising a rod 54 rotatable in the shaft 26 and having a collar 56 engaging arms 58 on the eccentrics 40. The rod 54 is connected to a suitable link 60 which may lead to a point adjacent the pilot's cockpit to be readily operable by the pilot.

In operation, if the propeller shaft is turned at the desired speed, springs 48 and centrifugal weights 36 will be balanced with the roller 28 in its neutral position such that the disc 18 will be driven at the same speed as the propeller shaft. If for any reason the propeller speed should decrease, it would be desirable to decrease the blade pitch to permit the propeller shaft to come back to the desired speed. As the speed decreases the weights 36 will swing in, turning the eccentrics 40 in a direction to permit the head member 42 and the sleeve 46 to move inwardly toward the shaft 4 under the influence of springs 48. This shifts the roller 28 inwardly so that it engages the disc 18 at a point of less radius and drives the disc faster than the propeller shaft. At this time the worm thread 24 on the disc turns the gears 16 and worms 14 to rotate the blades in a direction to decrease their pitch. As the propeller speed increases under the influence of decreased pitch, the weights 36 will move out, turning the eccentrics 40 and moving the head 42 and roller 28 outward. When the roller again reaches its neutral position there will be no more relative movement between the disc 18 and the shaft and the blades will remain stationary.

If the propeller speed should increase above that desired, the weights 36 will fly out. The eccentrics 40 will be turned in a direction to move the head 42 and roller 28 outwardly so that the roller engages the disc at a point of greater radius. Thus the disc will be driven slower than the shaft and will turn the gear 16 and worm 14 in a direction to increase the blade pitch. Upon an increase in blade pitch the speed will drop, permitting the weights 36 to move in so that the roller will be returned to its neutral position.

If the pilot desires to modify operation of the automatic control, as for example to obtain a fixed low pitch during take-off, he may adjust the link 60 to set rod 54 in the necessary position to give the desired pitch angle. This will result in fixing the weights 36 and springs 48 and hold the head member 42 against the eccentrics 40 with the roller in any desired position. Thus the pilot is able to obtain any pitch he desires regardless of operation of the automatic control.

Figure 2 illustrates a modified construction in which parts corresponding to like parts in Figure 1 have been designated by the same reference numbers plus 100. In this construction the shaft 126 is journaled in fixed brackets 162 and 164 which may be mounted on the frame or any other relatively stationary part. The weights 136 are carried by collar member 138 rigidly secured to the shaft and the spring 148 is concentric with and surrounds the shaft. The roller 128 has an extending hub portion 166 provided with a collar engaging arms on the weights 136 and against which the spring 148 rests.

The spring 148 is preferably made adjustable by providing a series of rods 168 extending through the collar 138 and carrying an annular abutment 170 against which the outer end of the spring abuts. The outer ends of rods 168 carry an annular bearing member 172 having a complimental bearing ring 174 which presses against the ends of a series of screws 176 carried by the bracket 164. By adjusting the screws 176, the tension of spring 148 may be varied to change the speed setting of the control device. In operation this embodiment of the invention is substantially identical with the embodiment of Figure 1 and will not be described in detail.

While only two embodiments of the invention have been shown and described in detail, it is not intended to limit the scope of the invention to the forms shown nor otherwise than by the terms of the appended claims.

What is claimed is:

1. A variable pitch propeller comprising a driving shaft, a blade rotatably carried by said shaft and extending at an angle therefrom, an annular disc rotatably surrounding the shaft and formed on one of its faces with a driving surface, gearing positively connecting the disc to the blade to turn the blade as the disc is rotated relative to the shaft, a driving roller engaging the driving surface, means mounting the roller for straight line shifting movement radially of the disc, means operable manually in a straight line for shifting the roller, and means operable from the driving shaft for driving the roller at a speed proportional to that of the driving shaft.

2. A variable pitch propeller comprising a driving shaft, a blade rotatably carried by said shaft and extending at an angle therefrom, an annular disc rotatably surrounding the shaft and formed on one of its faces with a driving surface, means connecting the disc to the blade to turn the blade as the disc is rotated relative to the shaft, a driving roller engaging the disc driving surface, means mounting the roller for straight line shifting movement radially of the disc, means responsive to the speed of said shaft for shifting the roller, and means operable from the driving shaft to drive the roller at a speed proportional to that of the driving shaft.

3. A variable pitch propeller comprising a driving shaft, a blade rotatably carried by said shaft and extending at an angle therefrom, an annular disc rotatably surrounding the shaft and formed on one of its faces with a driving surface, means connecting the disc to the blade to turn the blade as the disc is rotated relative to the shaft, a driving roller engaging the driving surface, means mounting the roller for straight line shifting movement radially of the disc, centrifugal means responsive to the speed of the propeller shaft to shift the roller, manual means connected to said centrifugal means to vary the effect thereof at will, and means operable from the driving shaft to drive the roller.

4. A variable pitch propeller comprising a driving shaft, a blade rotatably carried by said shaft and extending at an angle therefrom, an annular disc rotatably surrounding the shaft and formed on one of its faces with a driving surface, means connecting the disc to the blade to turn the blade as the disc is rotated relative to the shaft, a second shaft extending at an angle to the driving shaft and parallel to the face of the disc, means for drivably connecting the two shafts, a roller slidably keyed to the second shaft with its edge in driving engagement with the driving surface, and centrifugal means driven by the second shaft and connected to the disc to control the position thereof.

5. A variable pitch propeller comprising a driving shaft, a blade rotatably carried by said shaft and extending at an angle therefrom, an annular disc rotatably surrounding the shaft and formed on one of its faces with a driving surface, means connecting the disc to the blade to turn the blade as the disc is rotated relative to the shaft, a second shaft extending at an angle to the driving shaft and parallel to the face of the disc, means for drivably connecting the two shafts, a roller slidably keyed to the second shaft with its edge in driving engagement with the driving surface, centrifugal means driven by the second shaft and connected to the roller to control the position thereof, and manual means connected to the centrifugal means to vary the effect thereof at will.

6. A variable pitch propeller comprising a driving shaft, a blade rotatably carried by said shaft and extending at an angle therefrom, an annular disc rotatably surrounding the shaft and formed on one of its faces with a driving surface, means connecting the disc to the blade to turn the blade as the disc is rotated relative to the shaft, a driving roller engaging the driving surface, means mounting the roller for straight line shifting movement radially of the disc, means for driving the roller, resilient means urging the roller to slide in one direction, and means responsive to the speed of the driving shaft to urge the disc in the opposite direction.

7. A variable pitch propeller comprising a driving shaft, a blade rotatably carried by said shaft and extending at an angle therefrom, an annular disc rotatably surrounding the shaft and formed on one of its faces with a driving surface, means connecting the disc to the blade to turn the blade as the disc is rotated relative to the shaft, a driving roller engaging the driving surface, means mounting the roller for straight line shifting movement radially of the disc, means for driving the roller, resilient means urging the roller to slide in one direction, means responsive to the speed of the driving shaft to urge the roller in the opposite direction, and manual means connected to the speed responsive means to vary the effect thereof.

8. A variable pitch propeller comprising a driving shaft, a blade rotatably carried by said shaft and extending at an angle therefrom, an annular disc rotatably surrounding the shaft and formed on one of its faces with a driving surface, means connecting the disc to the blade to turn the blade as the disc is rotated relative to the shaft, a second shaft extending at an angle to the driving shaft and parallel to the face of the disc, means for drivably connecting the two shafts, a roller slidably keyed to the second shaft with its edge in driving engagement with the driving surface, resilient means urging the roller in one direction, and centrifugal means driven by the second shaft and urging the roller in the opposite direction.

9. A variable pitch propeller comprising a driving shaft, a blade rotatably carried by said shaft and extending at an angle therefrom, an annular disc rotatably surrounding the shaft and formed on one of its faces with a driving surface, means connecting the disc to the blade to turn the blade as the disc is rotated relative to the shaft, a second shaft extending at an angle to the driving shaft and parallel to the face of the disc, means for drivably connecting the two shafts, a roller slidably keyed to the second shaft with its edge in driving engagement with the driving surface, resilient means urging the roller in one direction, centrifugal means driven by the second shaft and urging the roller in the opposite direction, and manual means to control the position of said roller at will.

10. A variable pitch propeller comprising a propeller shaft, a blade rotatably mounted on said shaft and extending at an angle therefrom, an annular disc rotatably mounted on said shaft and having a flat radially-extending portion, gearing positively connecting the disc to the blade to turn the blade as the disc is rotated relative to the shaft, an annular gear secured to the shaft, a second shaft extending at substantially a right angle from the propeller shaft and having a pinion meshing with said gear, a traction roller slidably carried by the second shaft with its edge in driving engagement with said flat portion of the disc, and control means operable manually in a straight line for sliding the roller on the second shaft thereby to change its point of engagement with the disc.

11. A variable pitch propeller comprising a propeller shaft, a blade rotatably mounted on said shaft and extending at an angle therefrom, an annular disc rotatably mounted on said shaft and having a flat radially-extending portion, means connecting the disc to the blade, an annular gear secured to the shaft, a second shaft extending at substantially a right angle from the propeller shaft and having a pinion meshing with said gear, a traction roller slidably carried by the second shaft with its edge in driving engagement with said flat portion of the disc, resilient means urging the roller in one direction on the second shaft, and speed-responsive means carried by the second shaft and connected to the roller to urge it in the other direction.

12. A variable pitch propeller comprising a propeller shaft, a blade rotatably mounted on said shaft and extending at an angle therefrom, an annular disc rotatably mounted on said shaft and having a flat radially-extending portion, means connecting the disc to the blade, an annular gear secured to the shaft, a second shaft extending at substantially a right angle from the propeller shaft and having a pinion meshing with said gear, a traction roller slidably carried by the second shaft with its edge in driving engagement with said flat portion of the disc, resilient means urging the roller in one direction on the second shaft, speed-responsive means carried by the second shaft and connected to the roller to urge it in the other direction, and a manually operable member to control the position of the roller at will.

EDWARD M. BERTRAN.